United States Patent [19]

Elmer

[11] Patent Number: 5,551,156
[45] Date of Patent: Sep. 3, 1996

[54] REVOLVING BLADE SKINNING DEVICE

[75] Inventor: Stefan Elmer, Ötisheim, Germany

[73] Assignee: Schmid & Wezel GmbH & Co., Maulbronn, Germany

[21] Appl. No.: 290,778

[22] PCT Filed: Aug. 28, 1994

[86] PCT No.: PCT/EP93/02330

§ 371 Date: Apr. 19, 1995

§ 102(e) Date: Apr. 19, 1995

[87] PCT Pub. No.: WO94/05157

PCT Pub. Date: Mar. 17, 1994

[30] Foreign Application Priority Data

Sep. 1, 1992 [DE] Germany ............... 42 29 134.8

[51] Int. Cl.⁶ ............................................. A22B 5/16
[52] U.S. Cl. ............................. 30/276; 452/133
[58] Field of Search ............... 30/276, 347; 452/132, 452/133, 125

[56] References Cited

U.S. PATENT DOCUMENTS 4,368,560  1/1983  Wetzel et al. .................. 452/133
5,122,092  5/1992  Abdul ............................ 452/133
5,311,664  5/1994  Abdul ............................ 30/276
5,445,561  8/1995  Elmer ............................ 452/133

FOREIGN PATENT DOCUMENTS 318732   2/1920   Germany .
392115   3/1924   Germany .
538891  11/1931   Germany .
674322   4/1939   Germany .
21089   of 1907  United Kingdom ......... 30/276
122898   2/1919   United Kingdom ......... 30/276

*Primary Examiner*—Hwei-Siu Payer
*Attorney, Agent, or Firm*—Jones, Tullar & Cooper, P.C.

[57] ABSTRACT

A revolving blade skinning device is provided with a pair of housing shells, a drive motor mounted within the housing shells, a blade support mounted to the housing shells, a blade mounted on the blade support for rotation relative to the housing shells, and a gear drive situated in the housing shells and connected to the motor and the blade support. The gear drive includes a drive wheel driven by the drive motor and a belt situated between the drive wheel and the blade support. The belt imparts motion from the drive wheel to the blade support. The axis of rotation of the drive motor lies in the plane defined by the blade.

15 Claims, 1 Drawing Sheet

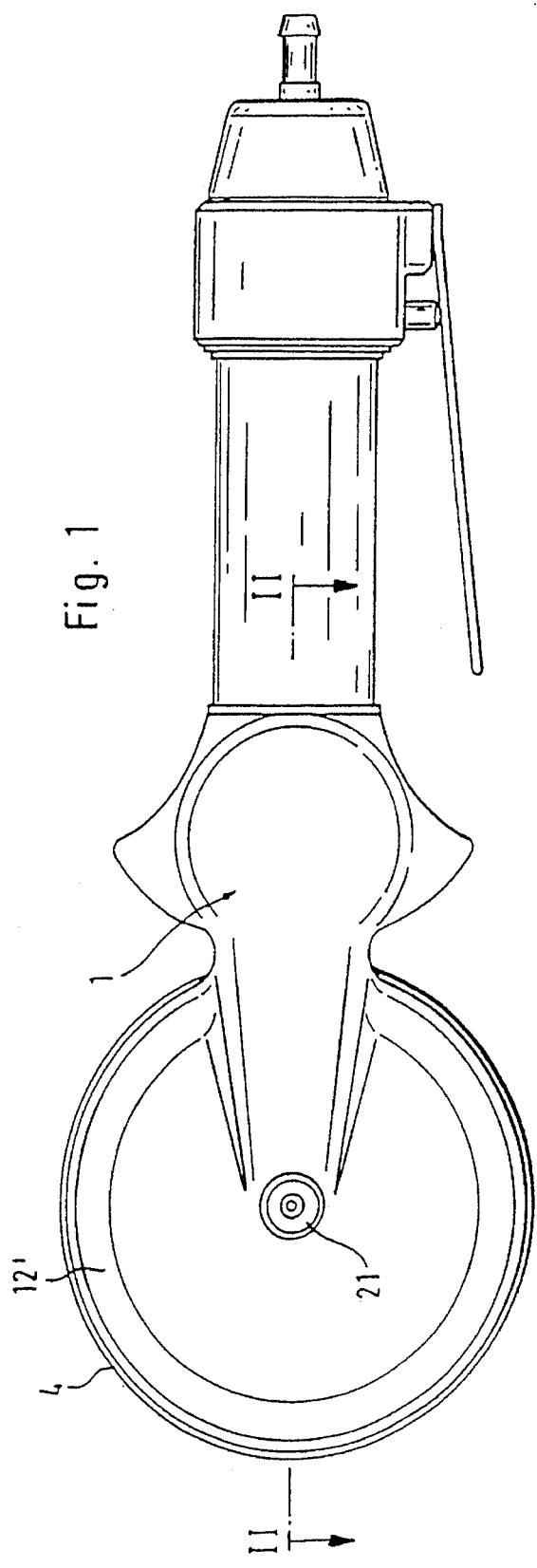
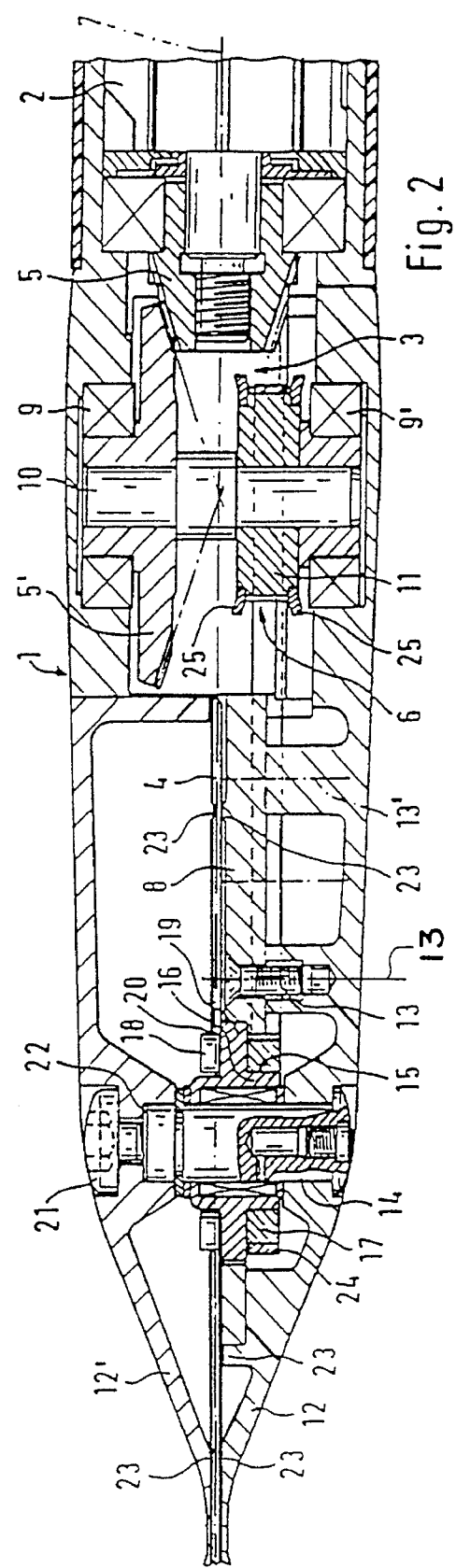
Fig. 1
Fig. 2

REVOLVING BLADE SKINNING DEVICE

BACKGROUND OF THE INVENTION

The present invention relates to a revolving blade skinning device with a drive motor which drives, via a gear, a revolving blade rotatably seated in a blade housing between two housing shells.

Such a revolving blade skinning device is known from DE-PS 392 115, wherein the gear is a miter gear, which directly drives the revolving blade. Seating and disposition of the miter wheels require a large structural height. The revolving blade is disposed eccentrically with respect to the handle, and the tilting moments occurring during operation, because of the asymmetry, make operation more difficult.

A worm drive is furthermore known from DE-PS 538 891. This drive is very voluminous and the blade is also disposed very asymmetrically here.

A symmetrical blade disposition is known from DE-PS 674 322. It has a miter wheel of very large diameter supporting the revolving blade, which is expensive to produce. A large volume together with a great structural weight in particular is also necessary here.

SUMMARY OF THE INVENTION

By way of avoiding the described disadvantages, the present invention has as an object providing an easily manipulated flat revolving blade skinning device which runs particularly quietly and has a low noise level, along with low structural weight and small structural volume.

This object is attained by characterizing features of claim 1 the gear being provided with a belt drive with a drive wheel directly or indirectly driven by the motor, and a blade support wheel driven by means of a belt and rotatably seated between the housing shells. Moreover, the revolving blade and the axis of rotation of the drive motor are located in the same plane.

A flat construction is made possible because of the use of a belt drive. The elastic belt drive absorbs oscillations, so that an operation free of fatigue and with little work noise is made possible.

The blade support wheel can have at least one, preferably a plurality of catches distributed over its circumference for a simple and rapid blade change, wherein the heads of flat head screws which project through openings in the revolving blade can be used as the catches. In a structurally particularly simple manner the blade support wheel can have a hub rotatably seated on a bearing bolt, wherein the belt of the belt drive is guided directly over this hub or over a belt wheel placed thereon. To save weight, the bearing bolt can be fixedly pressed into one of the housing shells and the other housing shell can be screwed at an exact distance via a clamping screw, wherein the exact distance between the housing shells is fixed by the contact faces of the bearing bolt and the housing shell, so that the revolving blade can revolve freely without seizing even when firmly prestressed, while it is still assured that the guide gap between the housing shells and the revolving blade is relatively narrow in order to prevent the penetration of foreign matter, if at all possible.

A particularly good revolving blade guidance can be achieved in that the bearing shells have at least in part guide bars circulating concentrically with respect to the bearing bolt and at a distance therefrom.

Simple cleaning and a simple blade exchange can be made possible in that after loosening the clamping screw and removal of the housing shells the revolving blade rests easily exchangeable on the blade support wheel without a particular fastening.

Quiet running of the drive wheel can be achieved in that it, together with a miter wheel, is rotatably seated between two bearings disposed in the blade housing, wherein the miter wheel cooperates with a second miter wheel driven by the drive motor. This makes a compact construction possible, which saves space and structural weight.

A particularly exact seating and quiet running as a result of this can be achieved in that the drive motor with the second miter wheel and the bearing which is near the first miter wheel are received in a part of the blade housing which is connected to form one piece. In this way the processing tolerance can be kept small with the least effort.

Saving structural weight and structural volume, the one piece housing part of the blade housing can be continued in one piece in a center wall, wherein the housing shell supporting the bearing bolt is screwed together with this center wall, and one of the bearings for the drive wheel can also be disposed in this bearing shell.

The belt drive can be a toothed belt drive for transferring large cutting forces, wherein the drive wheel and the blade support wheel have corresponding teeth on their circumferences.

BRIEF DESCRIPTION OF THE DRAWINGS

Further embodiments in accordance with the present invention are described in detail in the attached drawings. Shown are:

FIG. 1, which is a plan view of a revolving blade skinning device; and

FIG. 2, which is a partial section along the line II—II of FIG. 1 on an enlarged scale.

DESCRIPTION OF THE PREFERRED EMBODIMENT

A drive motor 2, which drives a revolving blade 4 via a gear 3, is disposed in a portion of a blade housing 1 embodied to be round in the manner of a handle. The gear 3 consists of a miter gear having two miter wheels 5, 5' and a following belt drive 6. The miter wheel 5 is provided directly on the drive shaft of the drive motor 2 in alignment with the axis of rotation 7. On a shaft 10 seated on bearings 9, 9' the miter wheel 5' is connected with a drive wheel 11. The bearing 9 is seated in the blade housing 1 in which the drive motor 2 is also seated, so that with simple processing, small manufacturing tolerances can be kept for the exact seating of the miter wheels 5, 5'. The bearing 9' is disposed in a housing shell 12, which is connected by means of several screws 13 with a center wall 8 of the blade housing 1. The screws 13 define cenerlines 13'.

A bearing bolt 14 has been pressed into the housing shell 12 at a distance from the bearing 9'. A blade support wheel 15 of the belt drive 6 is rotatably seated on the bearing bolt 14. The blade support wheel 15 consists of a hub 16 and a toothed belt wheel 17, which is screwed to a collar 19 of the hub 16 via flat head screws 18.

The revolving blade 4 has openings 20 distributed over the circumference, through which the heads of the flat head screws 18 project. A further housing shell 12' is held easily removable by a clamping screw 21 on the free end of the bearing bolt 14. The housing shell 12' and the bearing bolt 14 are provided with contact surfaces 22 of the same dimension, by means of which it is assured that, with the clamping screw 21 tightened, the revolving blade 4 disposed between the housing shells 12, 12' and the center wall 8 can rotate without seizing, but that only a small gap remains, so that foreign matter does not penetrate between the housing shells 12, 12', if at all possible. For improved blade guidance it is possible to provide guide bars 23 concentrically to the bearing bolt 14 on the housing shells 12, 12' and the center wall 8.

The revolving blade 4 is aligned with the axis of rotation 7, so that no tilting moments occur in the course of manipulation. The belt drive 6 is a toothed belt drive with a toothed belt 24 for transferring even large cutting forces, wherein the blade support wheel 15 and the drive wheel 11 have correspondingly adapted teeth. For lateral guidance the drive wheel 11 can be provided with two lateral rims 25.

Only the loosening of a single clamping screw 21 is required for cleaning and for exchanging the revolving wheel 4, so that time-saving maintenance and cleaning are possible.

I claim:

1. A revolving blade skinning device, comprising:

a pair of housing shells;

a drive motor mounted within said housing shells, said drive motor defining an axis of rotation;

blade support means mounted to said housing shells;

a blade mounted to said blade support means for rotation relative to said housing shells, said blade defining a plane of rotation; and gear means mounted within said housing shells between said drive motor and said blade support means, said gear means including a drive wheel driven by said drive motor and a belt situated between said drive wheel and said blade support means which imparts motion from said drive wheel to said blade support means, wherein the axis of rotation of said drive motor lies in said plane of rotation defined by said blade.

2. The revolving blade skinning device as defined in claim 1, wherein said blade support means includes a blade support wheel which has at least one catch situated about its circumference.

3. The revolving blade skinning device as defined in claim 2, wherein a flat head screw serves as said catch.

4. The revolving blade skinning device as defined in claim 2, wherein said blade support means further includes a bearing bolt, said blade support wheel includes a hub rotatably mounted on said bearing bolt, and wherein said belt is guided over said hub.

5. The revolving blade skinning device as defined in claim 4, further comprising:

a clamping screw, wherein said bearing bolt is fixedly pressed into one of said housing shells, the other of said housing shells being screwed to said one of said housing shells at a given distance by said clamping screw, and wherein the given distance is fixed by contact faces of said bearing bolt and said other of said housing shells.

6. The revolving blade skinning device as defined in claim 5, wherein said blade is held to one of said housing shells by said other housing shell and said clamping screw.

7. The revolving blade skinning device as defined in claim 4, wherein said housing shells define guide bars situated at a distance on each side of said bearing bolt.

8. The revolving blade skinning device as defined in claim 2, further comprising:

a belt wheel, wherein said blade support means further includes a bearing bolt, said blade support wheel includes a hub rotatably mounted on said bearing bolt and on which said belt wheel is mounted, and wherein said belt is guided over said hub.

9. The revolving blade skinning device as defined in claim 8, wherein said hub defines a shoulder, said belt wheel being received on said shoulder and being held thereon by a plurality of flat head screws which pass through said shoulder.

10. The revolving blade skinning device as defined in claim 8, wherein said hub defines a shoulder, said belt wheel being received on said shoulder and being held thereon by a plurality of flat head screws which pass through said shoulder.

11. The revolving blade skinning device as defined in claim 1, further comprising:

a pair of spaced apart bearings, wherein said gear means further includes a miter wheel, which together with said drive wheel are rotatably mounted between said spaced apart bearings, and wherein said gear means further includes a further miter wheel driven by said motor, said further miter wheel cooperating with said miter wheel.

12. The revolving blade skinning device as defined in claim 11, wherein said further miter wheel and one of said bearings are situated in one of said housing shells.

13. The revolving blade skinning device as defined in claim 12, further comprising:

a center wall;

wherein said blade support means further includes a bearing bolt, said housing shells supporting said bearing bolt are screwed together with said center wall, and wherein the other of said bearings is disposed in the other of said housing shells supporting said bearing bolt.

14. The revolving blade skinning device as defined in claim 1, wherein said belt comprises a toothed belt and wherein said drive wheel includes corresponding teeth.

15. The revolving blade skimming device as defined in claim 14, wherein said drive wheel includes two lateral rims for guiding said belt.

* * * * *

UNITED STATES PATENT AND TRADEMARK OFFICE
CERTIFICATE OF CORRECTION

PATENT NO. : 5,551,156
DATED : September 3, 1996
INVENTOR(S) : Stefan Elmer

It is certified that error appears in the above-indentified patent and that said Letters Patent is hereby corrected as shown below:

On the title page, item [86] the PCT filing date should be
--Aug. 28, 1993--, and the 371 and 102(e) dates should be
--Aug. 25, 1994--.

Signed and Sealed this

Twenty-seventh Day of March, 2001

Attest:

NICHOLAS P. GODICI

Attesting Officer

Acting Director of the United States Patent and Trademark Office